Aug. 15, 1933.  W. L. GOODMAN  1,922,035
FRYING AND COOKING APPARATUS
Filed Dec. 3, 1931   4 Sheets-Sheet 1
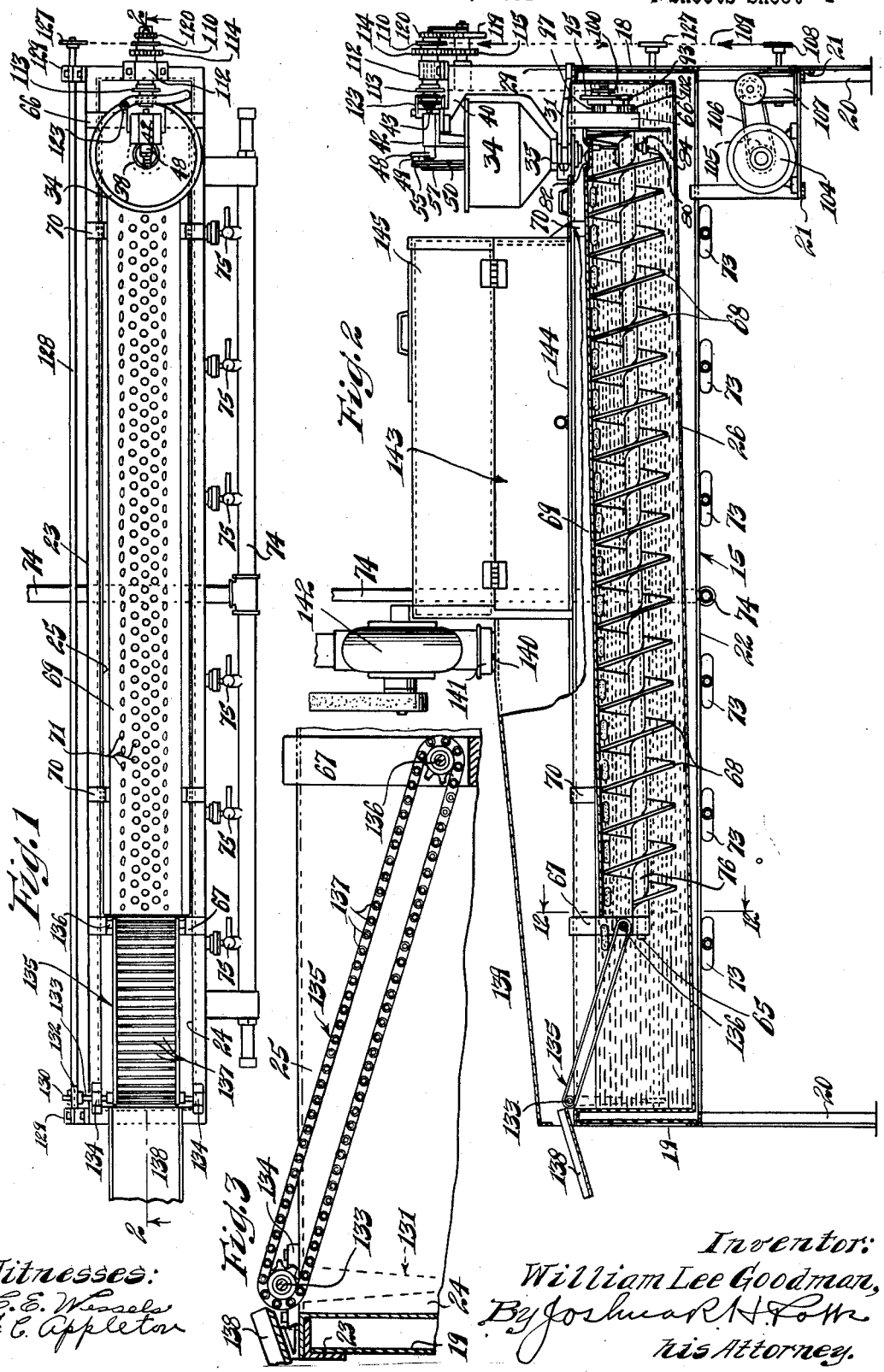
Witnesses:
C. E. Wessels
F. C. Appleton
Inventor:
William Lee Goodman,
By Joshua R H Potts
his Attorney.

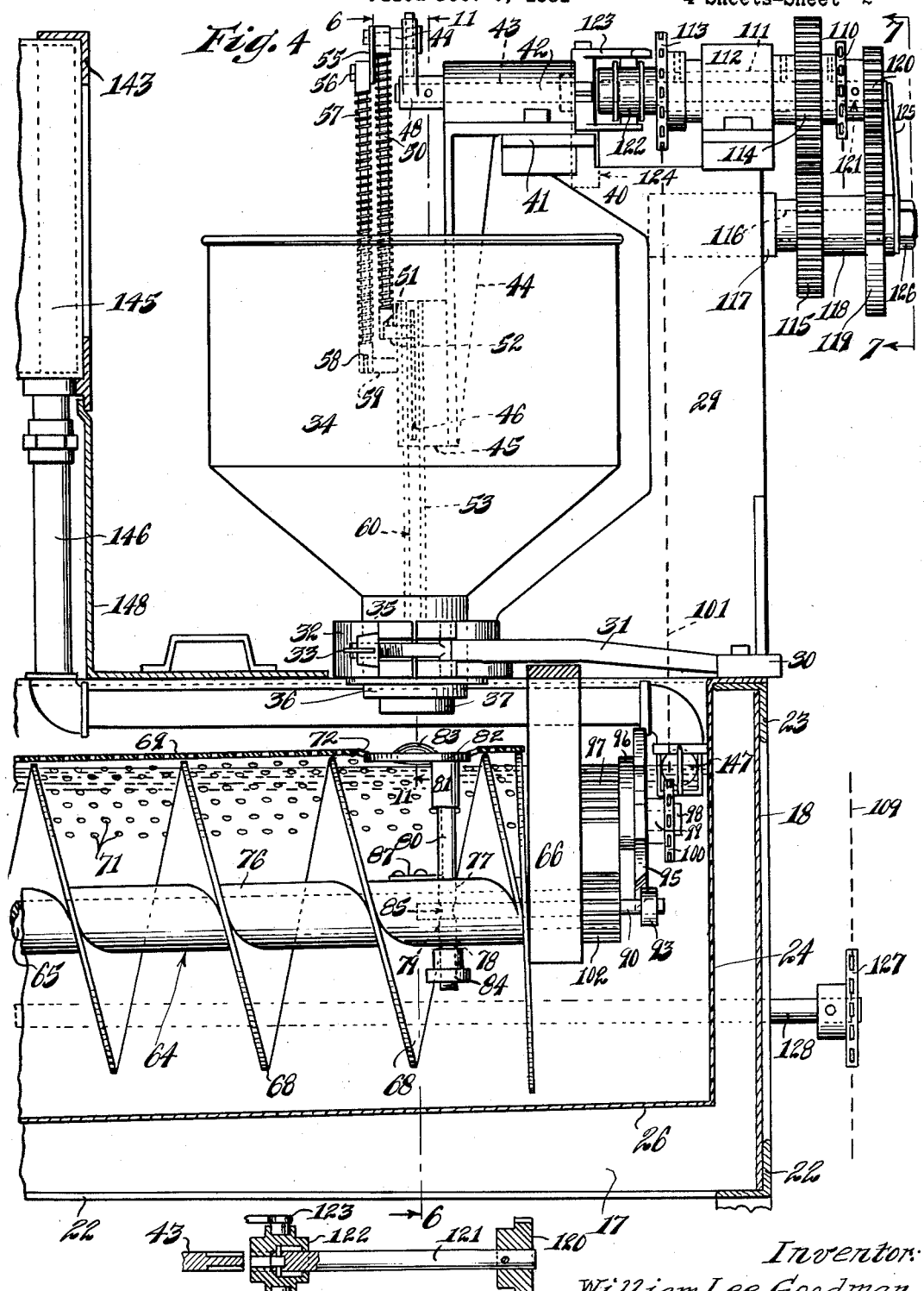

Aug. 15, 1933.   W. L. GOODMAN   1,922,035
FRYING AND COOKING APPARATUS
Filed Dec. 3, 1931   4 Sheets-Sheet 3
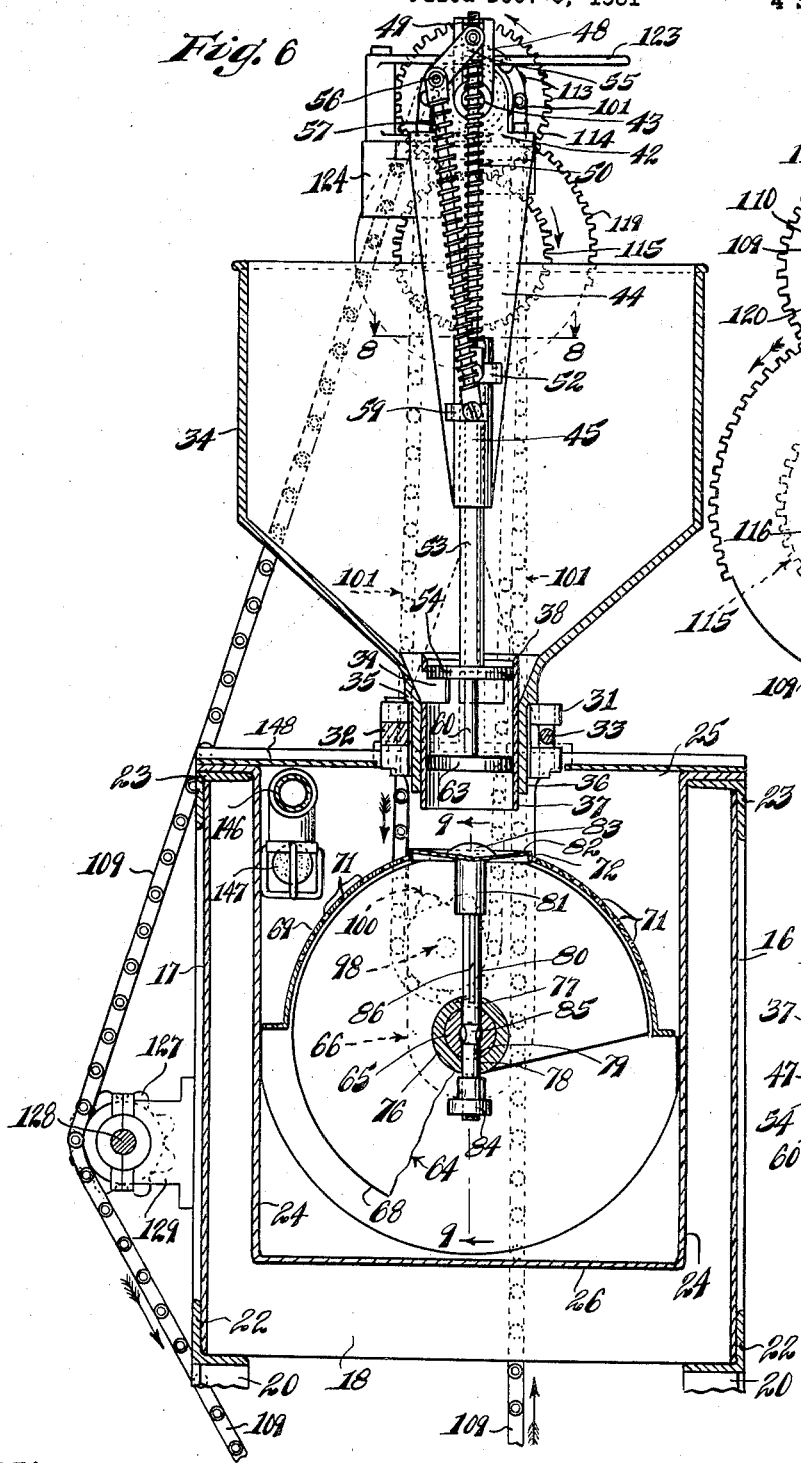
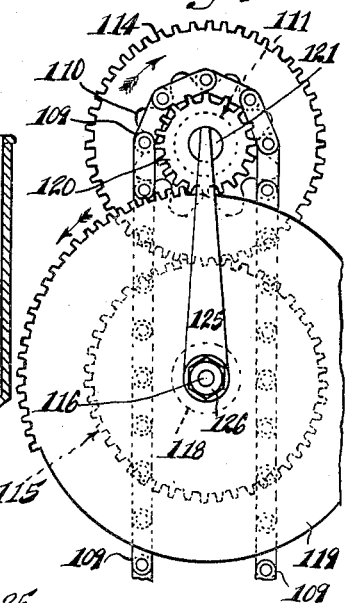
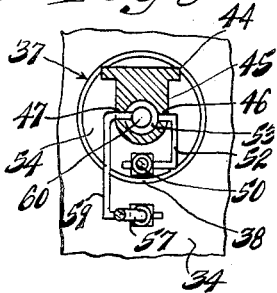
Witnesses:
C. E. Wessels
F. C. Appleton
Inventor.
William Lee Goodman,
By Joshua R. H. Potts
his Attorney

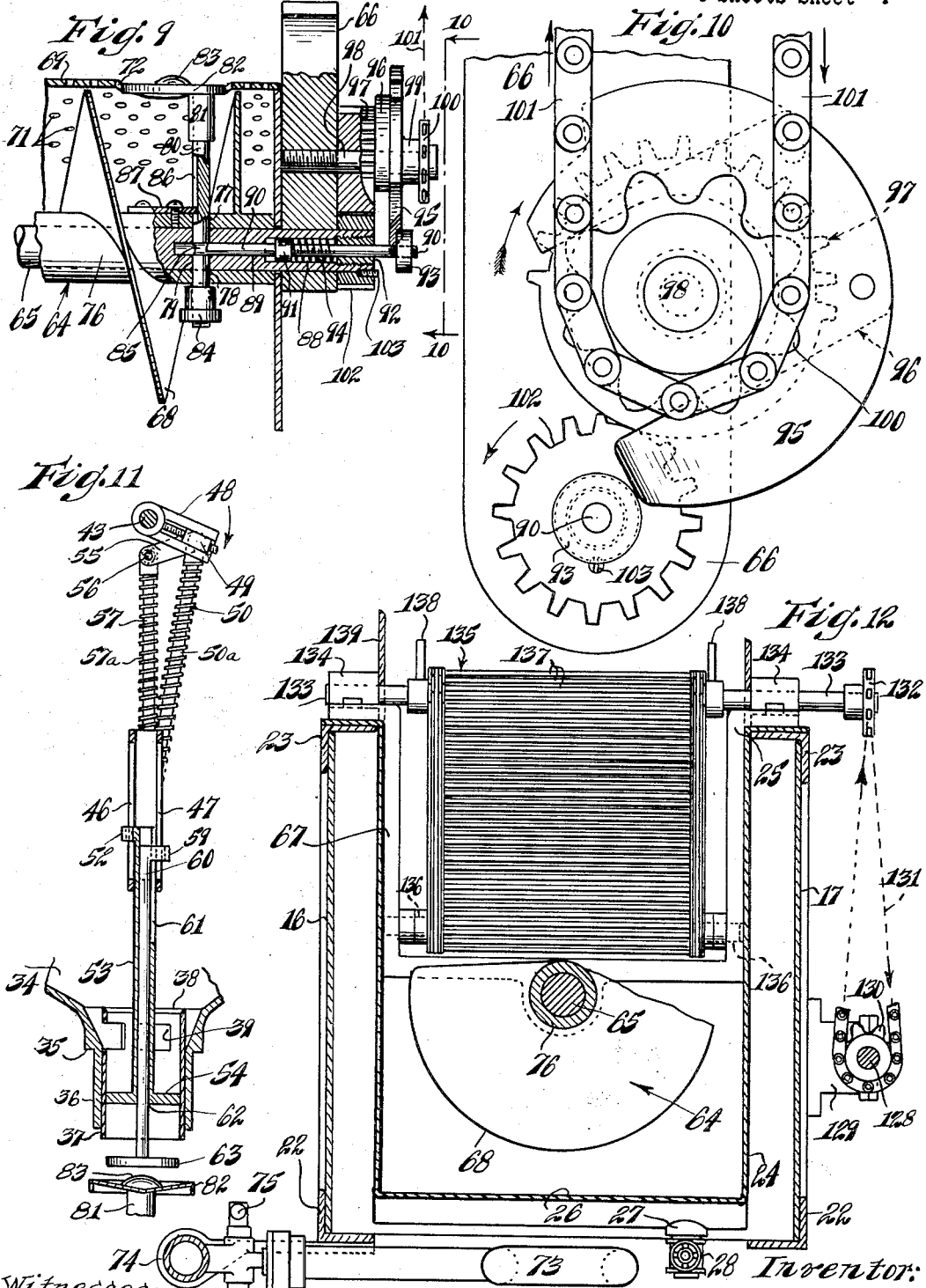

Patented Aug. 15, 1933

1,922,035

UNITED STATES PATENT OFFICE 1,922,035

FRYING AND COOKING APPARATUS

William Lee Goodman, Chicago, Ill., assignor to Bear-Stewart Co., a Corporation of Illinois Application December 3, 1931. Serial No. 578,641

8 Claims. (Cl. 107—4)

This invention relates to apparatus for frying and cooking doughnuts or similar articles.

One object of the invention, among others, is the provision of new and improved means for forming and cooking doughnuts and the like.

Still another object is the provision of novel means for conveying a formed doughnut to a cooking medium, to be cooked therein, and means for maintaining the form of the doughnut and for re-forming the doughnut in case its form has been altered after being originally shaped. Still another object is the provision of novel means for guiding a doughnut to a definite point in a cooking medium or container, wherefrom the same may be advanced in a definite path in order that the doughnut may be free from contact with miscellaneous objects such as sides and edges of a vessel. By the means which I have provided the danger of distortion to a doughnut will not only be eliminated, but a more evenly and better cooked doughnut will result.

An object also is the provision of novel operating mechanism for said means in timed co-operative relationship.

The invention also has for an object the provision of mechanism for accomplishing the said results which will be efficient, simple in construction, easy of manufacture, and of relatively low cost.

These and other objects and advantages of my invention will appear from the specification hereinafter set forth.

The invention consists in the combinations and arrangements of parts hereinafter described and claimed.

The invention will be best understood by reference to the accompanying drawings, forming a part of this specification, and in which:

Fig. 1 is a plan view of a preferred form of a machine of the present invention, with the upper hood removed;

Fig. 2 is a longitudinal section, partly in elevation, taken on the line 2—2 of Fig. 1;

Fig. 3 is an enlarged sectional detail view, in elevation, of the discharge conveyor shown in Fig. 2;

Fig. 4 is an enlarged detail view, in elevation, of the hopper mechanism and associated mechanism shown in Fig. 2;

Fig. 5 is a detail view, partly in section, of the clutch means for engaging and disengaging the hopper mechanism to the general operating means;

Fig. 6 is a sectional view taken on the line 6—6 of Fig. 4;

Fig. 7 is an elevational view of elements of the driving means, taken on the line 7—7 of Fig. 4;

Fig. 8 is a sectional plan view, taken on the line 8—8 of Fig. 6;

Fig. 9 is a longitudinal sectional view, taken on the line 9—9 of Fig. 6;

Fig. 10 is an enlarged detail view, taken on the line 10—10 of Fig. 9;

Fig. 11 is a sectional view of elements of the hopper mechanism shown in Fig. 6, but in a different position; and Fig. 12 is a sectional view taken on the line 12—12 of Fig. 2.

In the preferred form of construction which has been employed to illustrate the invention, the same comprises a housing 15, side walls 16 and 17, and end walls 18 and 19, the housing being supported by a plurality of legs 20, braces 21 being provided to connect the adjacent legs. Upper and lower angle irons 22 and 23 are provided for reenforcement and to support a cooking fluid container 24, as particularly shown in Figs. 2, 4, 6, and 12, said container being open at the top 25. The bottom 26 of the container 24 is inclined, as clearly appears from Fig. 2, to permit the cooking fluid contained therein to drain into a drain pipe 27 controlled by a valve 28. As clearly appears from Figs. 2 and 4, there is mounted at one end of the housing 15 on one of the angle irons 23 a standard 29, having a base 30 which is adapted to be supported on one of the angle irons 23. Extending laterally from the base of the standard 29 is a bracket member 31 to which is hinged a movable retaining member 32. The member 31 is provided with a swiveling wing nut 33 adapted to lock the movable member 32 to the member 31. The purpose of the member 31, in closed position of the movable member 32, is to provide a support for the hopper 34 which is adapted to contain a quantity of doughnut mixture from which portions may be cut and formed into doughnut units.

The hopper is provided with a shoulder 35 arranged to rest upon the bracket member 31 and the movable member 32 in such a manner that the hopper will be supported on the members 31 and 32 in elevated position, with the neck portion 36 of the hopper extending downwardly through the support formed by the members 31 and 32. The neck portion of the hopper has fitted therein a bushing 37, the bushing extending from the upper end of the neck portion to beyond the lower end of said neck portion. Extending upwardly from the bushing are vertical bars which are joined together at their upper ends by means of a circular band 38 corresponding in dimension to the bushing 37. The band and the bars are aligned downwardly with the bushing, preferably being formed integrally therewith. The construction provides openings 39 between each pair of bars to permit the dough in the hopper to be fed therethrough into the cylindrical chamber, and centers and guides the operation of the plungers, to be hereinafter described, in their reciprocation into and out of the bushing in the neck portion of the hopper.

The standard 29 has integrally formed at its upper end, an overhanging arm 40, and integral with this arm 40 is a bracket 41 to which is fixed a bearing 42 for a stud shaft 43. Integrally formed with the bearing 42, and extending downwardly, is an arm 44. Mounted on the arm 44 is a guide member 45, provided with a pair of vertically extending slots 46 and 47, the functions of which will appear hereinafter. Fixed to the shaft is a crank 48, and mounted on the arm of said crank is a stud 49. Pivoted on the stud 49 is one end of a yielding link member 50, the other end of which is forked as at 51 to a U-shaped connecting member 52 to which is attached a vertical sleeve 53 which is adapted to reciprocate vertically through the guiding member 45. This is made possible by the fact that the slot 46 in the guiding member 45 permits the U-shaped connecting member 52 to move vertically therethrough with the sleeve member 53. The lower end of the sleeve member 53 is provided with a cutting, feeding, or measuring plunger 54, which is adapted to reciprocate vertically upon movement of the sleeve 53, the same reciprocating into and out of the bushing 37.

As will be obvious to those skilled in the art, the plunger upon each reciprocation out of the bushing proper 37 will permit a quantity of doughnut material to flow into the bushing, and upon the downward stroke may serve to separate the material which is to be transferred to the bushing and prevent the flow of any further dough or material at that time, and may serve to assist in the discharge of the doughnut material in the neck portion.

Fixed on the stud 49 is one end of an arm 55, the other end of which is provided with a stud 56 to which is pivoted one end of a yielding link 57, the other end of which is forked as at 58. Pivotally mounted in the forked portion is a U-shaped connecting member 59 which extends through the slot 47. Secured to the connecting member is a vertically reciprocating rod 60 which is adapted to move within the sleeve 53, which sleeve is provided with a slot 61. The slot 61 is adapted to permit the U-shaped connecting member 59 to move vertically with the rod 60 which is located within the sleeve 53. The rod 60 extends downwardly through the sleeve 53 and extends further through an aperture 62 provided in the plunger 54. The rod extends downwardly beyond the plunger 54 to terminate in a forming plunger 63. The arrangement is such that, in a broad way, when the cutting plunger 54 has severed a portion of the doughnut material and discharged the same into the neck portion of the hopper, the forming plunger 63 is adapted to reciprocate downwardly out of the bushing 37 to allow the doughnut material in the neck portion of the hopper to be withdrawn therefrom by suction or gravity or both, or by the assistance of the cutting, feeding and measuring plunger if necessary, depending upon the consistency of the material employed.

In one of the common forms of material used for making doughnuts, the dough falls by gravity directly onto the forming plunger 63. The arrangement is such that when the forming plunger 63 is reciprocated downwardly out of the bushing, the doughnut material will be released to fall downwardly by gravity over the circumference of the plunger to form an uncooked doughonut, as will be manifest to those skilled in the art. In connection with the yielding link members 50 and 57, each of the same comprises generally a pair of sleeves, one of which has extending therefrom a guiding rod, and the two sleeves are compressed together by means of a coil spring, as will be clear from the drawings. In normal position, the coil spring holds each pair of sleeves in closed relation with their adjacent ends opposed to each other, as at 50A and 57A. In extended position the sleeves may be drawn apart with the spring extended, and in view of the fact that one of the sleeves is provided with a rod extending into the other sleeve, this rod will serve to guide the opposite sleeve back into opposed relation with the other sleeve upon return of the yielding link to normal position. The hopper mechanism above described is not claimed as an invention in and of itself, and no claim is made to the same except in combination with other mechanism herein described.

Mounted in the cooking fluid container is a single threaded screw propeller or conveyor 64. The propeller 64 comprises a shaft 65 which is journaled in bearings 66 and 67. The bearing 66 is higher than the bearing 67, which thereby inclines the shaft 65 and the propeller thereon downwardly from the feeding to the discharge end in the preferred form shown in Fig. 2. The function of the screw-threaded propeller or conveyor is to advance the doughnuts from the feeding to the discharge end by means of a counter-clockwise movement of the conveyor or propeller 64, looking from the feeding end of the machine. In the operation of the device, as will be manifest, the threads 68 of the conveyor or propeller, which rotate in the cooking fluid, propel the medium and the doughnuts floating therein toward the discharge end of the machine.

Mounted above the screw conveyor is a submerging guide 69 which is supported by brackets 70, as clearly appears from Fig. 2, and in part from Fig. 4. The submerging guide extends longitudinally the whole length of the propeller, and is semi-cylindrical transversely. One of the brackets, to-wit, that adjacent the discharge end of the machine, is longer than the bracket at the feeding end, which permits the submerging guide 69 to be positioned in an inclined manner over the propeller or conveyor, the inclination being downwardly from the feeding to the discharge end.

The guide 69 is provided with a plurality of perforations 71 to permit the escape of vapors and such from the cooking medium, and percolation of the same. At the feeding end of the device, directly under the neck portion of the hopper and registering with the cutting and forming members of the hopper mechanism, the guide 69 is provided with an opening 72, the function of which is to permit the formed but uncooked doughnuts to pass downwardly from the forming plunger to the cooking medium through the submerging guide 69. In the practical operation of the device the container 24 is filled with a cooking medium to the level where the surface of the cooking medium intersects the crown of the upper surface of the submerging guide 69, substantially in the middle thereof. With this arrangement one-half of the submerging guide 69 is submerged entirely in the cooking fluid, and the other half extends above the cooking medium. It will thus be seen especially from Fig. 2 that as the propeller or conveyor 64 is rotated the threads 68 will advance the floating doughnuts from the feeding to the discharge end and the same will gradually progress from a point where they are floating with only their lower portion submerged, to a point where the entire doughnut will be submerged in the cooking fluid, to be cooked on both sides. The cooking medium may be heated to the proper degree by gas burners 73 through which gas is supplied by a supply pipe 74 and valves 75, or other suitable means.

The container 24 with the conveyor 64 and the submerging guide 69 are not claimed independently in this application, but only in combination with other mechanism.

The propeller or conveyor 64 has a hub 76 which is apertured at 77 and 78 substantially beneath the opening 72 provided in the submerging guide 69. Similarly, that portion of the shaft 65 adjacent the apertures 77 and 78 is provided with a groove 79 adapted to register with the apertures 77 and 78. Arranged to extend through said apertures 77 and 78 and grooves 79 is a reciprocating rod 80 which is provided with a boss 81 supporting a transfer plate 82. The plate 82 is concaved on its upper surface and has a rounded raised portion 83 at the center thereof, as will appear clearly from Fig. 11. As hereinbefore stated, the reciprocatory rod 80 extends downwardly through the hub 76 through the opposite side thereof, where it is provided with a stop collar 84. The adjustable stop collar 84 prevents the reciprocatory rod 80 from being withdrawn through the hub on one side, and positions the movement of rod 80 so that the annular groove is moved into registry with the bore 89 at the proper time for engagement by detent rod 90; and the boss 81 on the other side controls the reciprocation of the rod 80 so that the movement of the transfer plate 82 is not interfered with by the threads 68.

The reciprocatory rod 80 is provided with an annular groove 85, as clearly appears from Figs. 4, 6, and 9, and is also equipped with a vertically extending slot 86 into which extends a lug 87 mounted on the hub 76. By this arrangement, with the lug 87 extending into the slot 86, the reciprocatory rod 80 is prevented from rotation. As appears from Figs. 4, 6, and 9, the shaft 65 is provided at the feeding end with a relatively large bore 88, which communicates with a relatively narrow bore 89. Adapted to reciprocate longitudinally in the narrow bore 89 is a detent rod 90, one end of which is adapted to seat itself in the annular groove 85 when the same is in registry with the narrow bore 89 and the other end extends beyond the end of the narrow bore 89 into the relatively large bore, where the detent rod 90 is equipped with a collar.

On the opposite side of the collar 91 the detent rod 90 extends through a bushing 92 and therebeyond to terminate in an adjustable outer collar 93. As will clearly appear from Fig. 9, a spring 94 is interposed between the plug 92 and the collar 91, and is adapted to maintain the detent rod 90 in engagement with the reciprocatory rod 80.

Mounted for engagement with the adjustable outer collar 93 is a cam disc 95 which is fixed to a hub 96, fastened to a mutilated gear 97 which is loose on a stud shaft 98 secured to the bearing 66. Integrally formed on the opposite side of the cam disc 95, as clearly appears in Fig. 9, is a hub 99 and a sprocket 100 adapted to be driven by a chain 101. At its outer end the shaft 65 is adapted to be driven by a gear 102 to which it is connected by a set screw 103, the gear 102 being designed to mesh with the teeth of the mutilated gear 97.

In the operation of the mechanism just described the sprocket 100 is connected by a chain 101 to a source of power, whereby the hub 99 and the connected cam disc 95, together with the mutilated gear 97, will be caused to rotate. The mutilated gear 97 upon rotation of the toothed part thereof will mesh with the teeth of the gear 102 to cause the same to rotate together with the conveyor shaft 65. The gear 102 not only drives the shaft 65 and the propeller or conveyor 64, but also, by the same token, causes the reciprocatory rod 80 which extends through the apertures 77 and 78 of the hub and also through the groove 79 of the shaft, to be rotated therewith. When the reciprocatory rod 80 has been reciprocated to the position shown in Fig. 9 the mutilated gear 97 will have driven the gear 102 to the point where the mutilated portion of the gear 97 is adjacent the gear 102. During the time the doughnut material is being deposited on the transfer plate 82, the gear 97 is traveling on its mutilated portion, and after the deposit, the cam portion of the cam disc 95 will begin to engage the adjustable outer collar 93. The disc 95 will be rotated, and during the time that the said disc is riding against the collar 93 the detent rod 90 will not only have been withdrawn from engagement with the reciprocatory rod 80, but the detent rod 90 will remain out of engagement with said rod until the surface of the cam disc passes out of contact again with the collar 93, whereupon the same will move back to its former position.

Upon the engagement of the cam surface of the cam disc 95 with the collar 93 and the withdrawal of the detent rod 90 from engagement with the reciprocatory rod 80, the reciprocatory rod will be caused by the force of gravity to reciprocate downwardly through the apertures 77 and 78 of the hood and through the groove 79 of the shaft 65. At this point, and for a considerable time thereafter, the collar 93 is engaged by the cam disc 95, and also at this time the toothed portion of the mutilated gear meshes with teeth of the gear 102 and drives the said gear and the shaft carried thereby. By this means the reciprocatory rod 80 is rotated, and when the reciprocatory rod 80 has been rotated through an angle of approximately 180 degrees the rod 80, by the force of gravity, will reciprocate in the opposite direction. In this condition the teeth of the mutilated gear 97 continue in contact with the teeth of the gear 102, and the movement of the shaft continues by the same token, When the reciprocatory rod 80 has been moved approximately through an angle of 250 degrees the cam surface of the cam disc 95 will have passed out of engagement with the collar 93 and the detent rod will be returned into engagement with the annular groove 85 by the spring 94; for in the then position of the reciprocatory rod 80 the annular groove of said rod will be in registry with the bore 89, and the detent will move automatically into locking position. In this condition the teeth of the mutilated gear will drive the teeth of the gear 102 until the reciprocatory rod 80 is again in vertical position, adapted to receive doughnut material upon the molding plate. In this condition the mutilated portion of the mutilated gear 97 will begin to engage the teeth of the gear 102, and the gear 102 and the shaft driven thereby will cease movement. During the passage of one-half of the mutilated portion of the gear 97 the time will be consumed in transferring the doughnut material from the forming plunger onto the transfer plate 82, and during the last half of the travel of the mutilated portion of the gear 97 the plate 82 will be moving downwardly into the cooking medium by means of the reciprocation of the rod 80 through the apertures 77 and 78 and the groove 79. In this manner the reciprocating rod 80 will cause the plate 82 to be submerged and leave the formed but uncooked doughnut floating in the cooking medium substantially in the center of the conveyor.

In the preferred form of operating means which I have disclosed it will be understood that the gear 97 is greater in diameter than the gear 102, and has not only a mutilated portion which is substantially equal in circumference to the toothed area, but has a toothed area provided with a number of teeth which are capable themselves of driving the pinion gear one complete revolution.

Power for the operating means is supplied from a motor 104 which drives a shaft on which there is mounted a pulley 105 which is connected by a belt 106 to a reduction gearing 107, which is in turn connected to a sprocket wheel 108 carrying a chain 109 which drives a sprocket 110 on the stud shaft 111 journaled in the bearing 112. Integral with the sprocket 110 is a hub which is secured to the shaft 111 and also mounted on this shaft 111 is a second sprocket 113 similarly secured thereto. The sprocket 113 carries the chain 101 to drive the sprocket 100. As hereinafter described, the sprocket 100 is adapted to operate the gears for the conveyor or propeller 64 and the mechanism for operating the transfer plate 82. By the means just described, power is carried from the motor 104 to the sprocket 100, whereby the said mechanism will be operated.

The means whereby power is transmitted to the hopper mechanism will now be explained. Also mounted on the shaft 111 and adapted to be driven thereby is a gear 114 which is arranged to mesh with a gear 115 loosely mounted on a stud shaft 116 journaled in a bracket 117 mounted on the standard 29. The gear 115 is operatively connected to a hub 118 and a mutilated gear 119. Adapted to mesh with the teeth of the mutilated gear 119 is a pinion gear 120, which is fixed on a clutch shaft 121 located within the sleeve shaft 111. At the opposite end from that on which the pinion gear 120 is positioned, clutch mechanism 122 is provided for effecting an operative driving connection between the shaft 121 and the shaft 43 for operating the hopper mechanism. The clutch mechanism is equipped with an operating handle 123 pivoted on an extension boss 124 supported on the standard 29. By this clutch arrangement the power may be transmitted to the gear 120 and the shaft 121 to operate the yielding plungers of the hopper mechanism hereinbefore described. I have provided a spring-held arm 125 secured by a nut 126 on the outer end of the stud shaft 116, which arm functions to control the lateral movement of the clutch shaft 121.

In the preferred form which has been employed to illustrate the present invention, the hopper mechanism operates substantially only during the period that the plate 82 is in raised position adapted to receive doughnut material from the forming plunger and during the period required by the plate to descend into the cooking medium. Inasmuch as the shaft 65 is driven through the mutilated gear 97 and does not revolve during the period when the plate 82 is raised or descending, the hopper mechanism is substantially idle while the shaft 65 is rotating. I have provided appropriate gearing to effect this arrangement in the preferred form employed. As will be apparent from Figs. 4, 6, and 7, the mutilated gear 119 is provided with teeth for only a small portion of its circumference, to-wit, substantially one-third of its circumference. By this arrangement, the pinion gear 120 is idle during substantially two-thirds rotation of the mutilated gear 119.

By the means which I have described for the operation of the shaft for the hopper mechanism and by the mutilated gearing arrangement which has been described for the operation of the shaft 65 and the associated mechanism, there has been provided an arrangement for timing the operation of the hopper mechanism to the mechanism of plate 82 and the conveying mechanism to accomplish the functions herein set forth.

As will be apparent from Figs. 1, 2, 3, and 6, there has been provided mechanism for effecting the discharge of cooked doughnuts. Power for this means is supplied by the chain 109 which drives a sprocket 127 to drive a shaft 128 mounted in bearings 129 mounted on the framework of the machine. Mounted on the shaft 128 is a sprocket 130 carrying a chain 131 to drive a sprocket 132 mounted on a shaft 133 journaled in bearings 134 supported on the angle members 123. Carried by the shaft 133 is an endless conveyor 135, the other end of which is supported by a shaft 136, said shaft being provided with sprockets for driving the endless conveyor. In the preferred form shown, the propeller is provided with laterally arranged rods 137 which permit the cooked doughnuts to drain therebetween. Positioned adjacent the upper end of the endless conveyor is a discharge chute 138, down which the cooked doughnuts may slide by gravity.

The machine is provided with a hood 139 having a collar 140 adapted to receive the sleeve 141 of a fan 142. The hood 139 is removable, and adjacent the hood 139 is a stationary hood 143 having a door 144. The stationary hood cooperates with the hood 139 to collect any vapors and enable them to be drawn off by the fan 142. By means of the door 144 an operator is permitted access to the interior of the device. Mounted upon the stationary hood 143 is a reservoir 145 in which may be kept a supply of lard or other cooking medium which may be fed through a pipe 146 having a float valve 147 adapted to regulate the admission of the cooking medium into the container 24. By this means the cooking medium in the container may be kept substantially at a predetermined level. A detachable closure plate 148 is provided adjacent the feeding end of the container for closing said portion and for conserving the heat and limiting the escape of vapors.

The operation of the mechanism will be manifest from the foregoing. Preferably the initial step is to provide a quantity of doughnut material in the hopper. The motor may then be switched on and by means of the gearing, which I have described, the yielding plungers of the hopper mechanism will be caused to operate. By this means the cutting plunger will measure, cut and feed a more or less definite amount of doughnut material into the neck portion of the hopper. In the usual practice, the doughnut material is of such fluidity that it flows by gravity onto the forming plunger and when the forming plunger reciprocates downwardly out of the neck portion of the hopper the doughnut material will flow by gravity over the circumference of the forming plunger. As the material falls off the forming plunger the transfer plate 82 will be in raised position underneath the forming plunger and closely adjacent thereto to receive the doughnut material after a minimum fall. The material will then drop onto the plate and arrange itself in the concave portion and about the rounded raised portion in the center of the plate.

Following this operation, the plate 82, which has been held in raised position by the detent rod 90, will be released because of the action of the cam disc 95 upon the collar 93 in withdrawing said detent rod, and the plate 82 will fall vertically downwardly by gravity, leaving the formed but uncooked doughnut floating upon the surface of the cooking fluid in the center of the conveyor between a pair of the threads 68. The threads will then advance the doughnuts gradually from the feeding end to the discharge end of the machine without turning the same. During the first portion of the travel of the doughnuts the same will be floating upon the top of the cooking medium and will continue to do so until they approach the intersection between the inclined submerging guide and the level of the cooking medium, from which point they will be gradually submerged until the doughnuts are wholly immersed in the cooking medium. The propeller or conveyor will continue to advance the doughnuts to the discharge end of the machine beneath the submerging guide, and at the end of the guide the doughnuts will float onto the endless conveyor which will convey them upwardly out of the cooking medium and discharge them upon the discharge guide, down which they will slide by gravity.

As described in detail, after the plate 82 has descended by gravity into the cooking medium, the shaft 65 will be rotated and the plate 82 will subsequently return to its extended position by gravity, after which the detent rod 90 will again engage the annular groove in the rod 80 to maintain the plate 82 in extended position. When the plate is in this position, the shaft continues its rotation to again bring the plate 82 to the original position in extended condition adjacent the forming plunger, ready to receive another portion of doughnut material thereon.

As stated, the transfer plate 82 is concaved adjacent its circumference, and has a raised rounded portion in the middle on the upper surface. The doughnut unit in the transfer of the same from the forming plunger to the transfer plate may be conveyed in the form given to it by the forming plunger. In this case the transfer plate will preserve and maintain the form so given to the unit by the plunger with the under surface of the doughnut unit deposited in the circular concaved portion adjacent the circumference of the transfer plate. The rounded raised portion in the center of the transfer plate will extend upwardly into the hole portion of the doughnut to enable the unit to retain its form and to permit of the deposit of the unit in its proper form in the cooking medium upon the downward movement of the plate, leaving the unit floating in the medium. In case the forming plunger has not formed the doughnut unit as desired, or in case a desirably formed unit has had its form altered in the transfer of the unit from the forming plunger to the transfer plate, the transfer plate will act to properly form the unit, or re-form the same, as the case may be.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to secure by Letters Patent is:

1. In a doughnut making machine or the like, a hopper mechanism for feeding portions of doughnut material, a container adapted to contain a medium for cooking such portions, an element located adjacent the feeding means and adapted to receive said portions as the same are dropped from the feeding means and to transfer the portions directly downward to a point substantially beneath said hopper mechanism.

2. In a doughnut making machine or the like, hopper mechanism for feeding portions of doughnut material, a container having a medium adapted to cook said portions, a plate adapted to receive said portions from said hopper mechanism and transfer the same to said medium, said plate being operable by gravity.

3. In a doughnut making machine or the like, hopper mechanism for feeding portions of doughnut material, a container having a medium adapted to cook said portions, a plate adapted to receive said portions from said hopper mechanism and transfer the same to said medium, said plate being operable by gravity and means for locking said plate in a definite position.

4. In a doughnut making machine or the like, hopper mechanism for feeding portions of doughnut material, a container having a medium adapted to cook said portions, means adapted to receive said portions from said hopper mechanism and transfer the same to said medium, said means being operable by gravity.

5. In a doughnut making machine or the like, hopper mechanism for feeding and forming portions of doughnut material, a container having a medium adapted to cook said portions, means for receiving said portions from said hopper mechanism above said medium and to transfer the same directly downward to said medium beneath said hopper mechanism.

6. In a doughnut making machine or the like, hopper mechanism for feeding and forming portions of doughnut material, a container having a medium adapted to cook said portions and advancing means therein, means adapted to receive said portions from said hopper mechanism and transfer the same to the path of said advancing means at a point substantially directly below said hopper mechanism.

7. In a doughnut making machine or the like, means for feeding and forming portions of doughnut material, a container having a medium adapted to cook said portions, means for advancing said portions through said cooking medium and means adapted to receive said portions from said feeding and forming means above said cooking medium and to transfer the same directly to the cooking medium, at a point substantially directly beneath said means for feeding the portions of doughnut material.

8. In a doughnut making machine or the like, hopper mechanism for feeding and forming portions of doughnut material, a container having a medium adapted to cook said portions, means for advancing said portions through said cooking medium, and means operatively connected to said advancing means for receiving the said portions from the hopper mechanism above said medium and transferring the portions into the path of said advancing means.

WILLIAM LEE GOODMAN.